Oct. 20, 1925.
K. KIEFER
CONVEYING DEVICE
Filed July 10, 1920
1,558,016
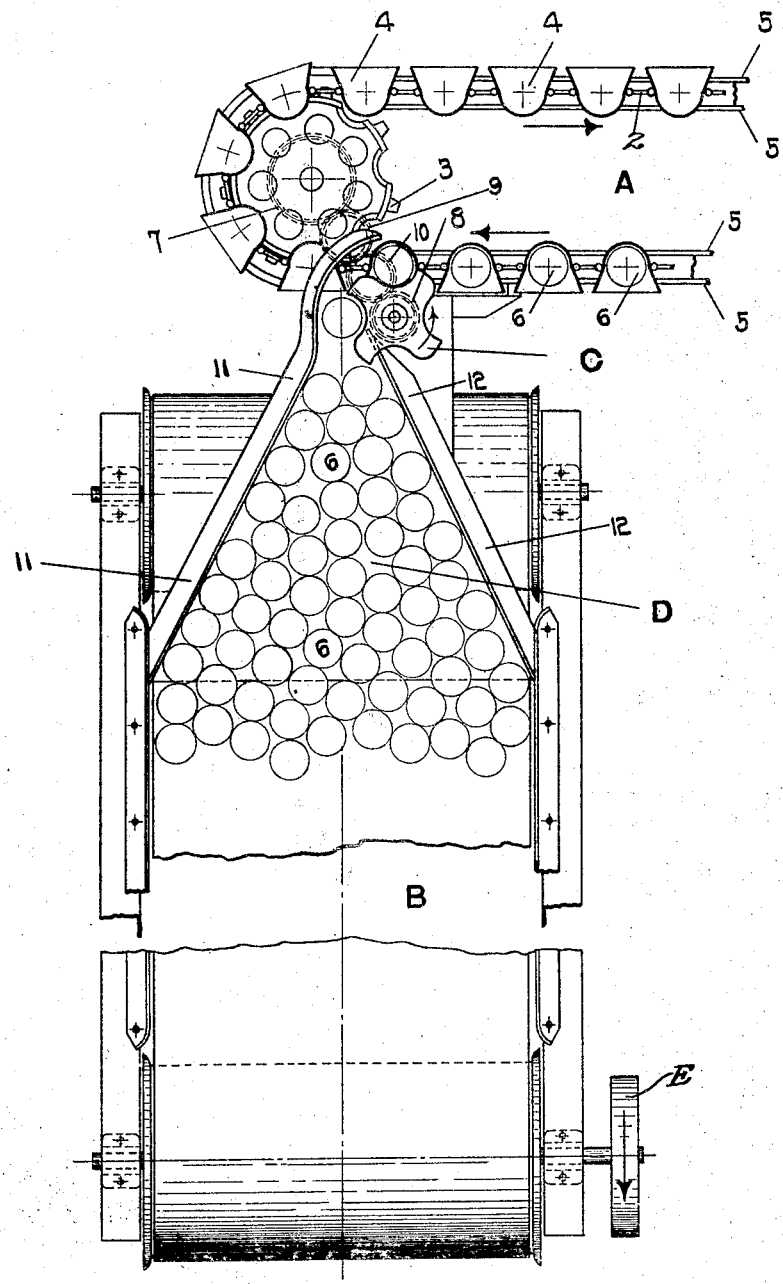
WITNESSES.
INVENTOR.
Karl Kiefer Patented Oct. 20, 1925.

1,558,016

UNITED STATES PATENT OFFICE.

KARL KIEFER, OF CINCINNATI, OHIO.

CONVEYING DEVICE.

Application filed July 10, 1920. Serial No. 395,190.

*To all whom it may concern:*

Be it known that I, KARL KIEFER, a citizen of the United States, and a resident of Cincinnati, in the county of Hamilton and State of Ohio, have invented certain new and useful Improvements in Conveying Devices, of which the following is a specification.

My invention relates particularly to that kind of conveying device which is used for the handling of containers such as cans or bottles, during the operation of washing, drying, filling, labeling, or other kindred operations.

The device as drawn particularly shows the transporting of containers or vessels by a single line feed, and automatically transfers the same to a collecting conveyor where vessels are crowded together in a column of any desired width.

In the drawing:

The single figure is a partial plan view of the device.

A is the single line feed conveyor; B shows the collecting conveyor. As shown, the single line feed conveyor is of the endless tray series type. An endless chain 2 travels around a sprocket 3 in the direction of the arrows shown carrying trays 4 traveling on rails 5. The correct distances between the trays are determined by the pitch of the sprocket wheel 3. Vessels 6 shown in the drawing as circles, are placed upon these trays, and it is the object to crowd these vessels on to the collecting belt conveyor B.

This is accomplished by the star wheel C turning on a fixed axle and driven by gear train shown in dotted lines, consisting of driving gear 7 concentric with the sprocket 3, driven gear 8 concentric with the star wheel C, and two intermediate small gears 9 and 10. Each gear is shown by three dotted circles denoting the pitch circle, and two circles each for the base and top of the teeth. Driving gear 7 and driven gear 8 must be in certain relation to each other. If there are four teeth to the star wheel C and there are seven teeth to the sprocket wheel 3, then the relation of the gear 7 to the gear 8 must be as seven to four.

This arrangement accomplishes the proper placing of each container into the recess of the star wheel C. Two bars 11 and 12, the first one curving around the star wheel C, guide the container in a lateral direction into a triangular pan D of which the bars 11 and 12 are the sides, spaced sufficiently at the star wheel to admit only one container and spaced the approximate width of the collecting conveyor belt at their other ends some distance along the collecting conveyor.

The speed of travel for collecting belt B, continuously driven by means of pulley E, is now so arranged that the containers arriving at the belt offer a resistance to the containers following so that they have to force and guide themselves into the spaces between the pan sides 11 and 12. It is advisable to make the surface of the fixed receptacle or bottom of the pan D a smooth one so as to decrease the friction. It is also advisable not to crowd the containers too closely together.

The respective speeds of the two belts is easily figured out. For instance, if conveyor A furnishes forty bottles per minute at a certain speed, and the collecting belt conveyor can take care of eight rows of containers side by side, the speed of this collector belt should be only one fifth per minute the speed of the supply tray carrier A.

Having described my invention what I claim and desire to secure by Letters Patent is:

1. In a conveying device, a conveyor holding articles in single file at regular intervals, a star wheel engaging the articles on said conveyor and taking the articles therefrom, a continuously moving collecting conveyor, and fixed means engaged by the articles whereby said star wheel spreads said articles across said collecting conveyor.

2. In a conveying device, a supply conveyor and a receiving conveyor, a rigid spreading plate, and lateral guides diverging along said plate from said supply conveyor to said receiving conveyor.

3. In a conveying device, a single-file conveyor, a star wheel engaging the articles on the conveyor and taking said articles from said conveyor in single file, a collecting conveyor to receive said articles side by side, and fixed means receiving said articles from said star wheel whereby said articles are crowded by said star wheel in the direction of conveyance by said collecting conveyor into side-by-side relation on said collecting conveyor.

4. In a conveying device, a single-file conveyor, a star wheel rotating on a fixed axis and taking articles from said conveyor in single file, a collecting conveyor to receive said articles side by side, and a pan with raised sides diverging from said star wheel to said collecting conveyor, wherein said articles are crowded by said star wheel into side-by-side relation on said collecting conveyor.

5. In a conveying device, a single-file conveyor, a star wheel rotating on a fixed axis and taking articles from said conveyor in single file, a collecting conveyor to receive said articles side by side, and a pan with raised sides spaced sufficiently adjacent to said star wheel only to receive said articles in single file from said star wheel and diverging from said star wheel to said collecting conveyor, wherein said articles are crowded by said star wheel into side-by-side relation on said collecting conveyor.

6. In a conveying device, a single-file conveyor, a star wheel rotating on a fixed axis and taking articles from said conveyor in single file, a collecting conveyor to receive said articles side by side, and a pan with raised sides, one of said sides curving around said star wheel partly across said single-file conveyor, and said sides being spaced sufficiently adjacent to said star wheel only to receive said articles in single file from said star wheel and diverging from said star wheel to said collecting conveyor, wherein said articles are crowded by said star wheel into side-by-side relation on said collecting conveyor.

KARL KIEFER.